US012741270B2

(12) United States Patent
Mukherjee et al.

(10) Patent No.: US 12,741,270 B2
(45) Date of Patent: Sep. 22, 2026

(54) DECARBONIZED OLEFINS PRODUCTION USING PROCESS INTENSIFICATION

(71) Applicant: Exelus Inc., Fairfield, NJ (US)

(72) Inventors: Mitrajit Mukherjee, Fairfield, NJ (US); Vamsi M. Vadhri, North Arlington, NJ (US); Narendra Joshi, Jersey City, NJ (US); Sankaran Sundaresan, Fairfield, NJ (US)

(73) Assignee: Exelus Inc., Fairfield, NJ (US)

( * ) Notice: Subject to any disclaimer, the term of this patent is extended or adjusted under 35 U.S.C. 154(b) by 377 days.

(21) Appl. No.: 18/393,554

(22) Filed: Dec. 21, 2023

(65) Prior Publication Data

US 2024/0207821 A1 Jun. 27, 2024

Related U.S. Application Data

(60) Provisional application No. 63/434,463, filed on Dec. 21, 2022.

(51) Int. Cl.
*B01J 23/18* (2006.01)
*B01J 23/10* (2006.01)
(Continued)

(52) U.S. Cl.
CPC .............. *B01J 23/18* (2013.01); *B01J 23/10* (2013.01); *B01J 35/40* (2024.01); *B01J 35/613* (2024.01);
(Continued)

(58) Field of Classification Search
CPC ... B01J 23/10; B01J 23/18; B01J 35/40; B01J 35/613; B01J 37/0201; B01J 37/031; B01J 37/033; B01J 37/036; B01J 37/08; B01J 38/02; C07C 5/3332; C07C 2523/10; C07C 2523/18; C10G 11/02; C10G 11/04; C10G 11/18; C10G 11/182
See application file for complete search history.

(56) References Cited

U.S. PATENT DOCUMENTS

| | | | |
|---|---|---|---|
| 4,435,607 | A | 3/1984 | Imai |
| 5,043,500 | A | 8/1991 | Tagamolila |

(Continued)

FOREIGN PATENT DOCUMENTS

| | | | |
|---|---|---|---|
| WO | 2020236707 | A1 | 11/2020 |
| WO | 2020236738 | A1 | 11/2020 |

OTHER PUBLICATIONS

Bal, B., et al., 2021, International Journal of Hydrogen Energy, 46, 13561-13571. <https://doi.org/10.1016/j.ijhydene.2020.09.223> (Year: 2021).*

(Continued)

*Primary Examiner* — Brian A Mccaig
(74) *Attorney, Agent, or Firm* — Frank Rosenberg

(57) ABSTRACT

A mixed metal oxide Selective Oxygen Carrier (SOC) suitable for the selective oxidation of hydrogen comprising bismuth oxides, rare earth oxides, and a dopant of Ti, Zr, and Hf and is characterizable by a high level of oxygen carrying capacity, selectivity and stability. The SOC can be synthesized using a sol gel procedure, co-precipitating salts, or the incipient wetness method. The invention includes a process of dehydrogenating a paraffin over a SOC. A SOC can also be used to catalytically crack hydrocarbons.

20 Claims, 2 Drawing Sheets

(51) Int. Cl.

| | |
|---|---|
| ***B01J 35/40*** | (2024.01) |
| ***B01J 35/61*** | (2024.01) |
| ***B01J 37/02*** | (2006.01) |
| ***B01J 37/03*** | (2006.01) |
| ***B01J 37/08*** | (2006.01) |
| ***B01J 38/02*** | (2006.01) |
| ***C10G 11/04*** | (2006.01) |

(52) U.S. Cl.

CPC ......... *B01J 37/0201* (2013.01); *B01J 37/033* (2013.01); *B01J 37/036* (2013.01); *B01J 37/08* (2013.01); *B01J 38/02* (2013.01); *C10G 11/04* (2013.01); *C10G 2300/1085* (2013.01); *C10G 2300/70* (2013.01)

(56) References Cited

U.S. PATENT DOCUMENTS

| | | | | |
|---|---|---|---|---|
| 5,430,209 | A | 7/1995 | Agaskar et al. | |
| 11,033,880 | B2 * | 6/2021 | Mukherjee ............... | B01J 21/04 |
| 2004/0167013 | A1 | 8/2004 | Ou et al. | |
| 2021/0213424 | A1 | 7/2021 | Sofranko et al. | |

OTHER PUBLICATIONS

Agency, International Energy. Technology Roadmap: Energy and GHG Reductions in the Chemical Industry via Catalytic Processes. 2013.

Mackenzie, Wood. Ethylene Global Supply Demand Analytics Service. [Online] 2021. https://www.woodmac.com/news/editorial/ethylene-global-supply-demand-analytics-service/. Accessed Mar. 30, 2024.

IEA. The Future of Petrochemicals. 2021.

Brazdil, J. F. "Strategies for the selective catalytic oxidation of alkanes", Topics in Catalysis, 38(4) (2006) 289-294. doi:10.1007/s11244-006-0027-4.

Ren, T. et al. "Olefins from conventional and heavy feedstocks: Energy use in steam cracking and alternative processes", Energy, 2006, vol. 31, pp. 425-451.

Dudek, R.B. et al., "Selective hydrogen combustion as an effective approach for intensified chemical production via the chemical looping strategy.", Fuel Processing Tech, 2021, 218.

Lin C. H, et al., "Development of catalyst system for selective combustion of hydrogen", Appl. Catal. A 164 (1997) 59-67.

Grasselli, RK, et al., "Catalytic dehydrogenation (DH) of light paraffins combined with selective hydrogen combustion (Shc) I. DH/SHC/DH catalysts in series (co-fed process mode)", Appl Catal A 1999;189:1-8.

Tsikoyiannis JG, et al. "Metal oxides as selective hydrogen combustion (SHC) catalysts and their potential in light paraffin dehydrogenation", J Catal 1999;184:77-86.

Late, L_Part_I et al., "Selective combustion of hydrogen in the presence of hydrocarbons Part 2. Metal oxide based catalysts", Appl Catal A 2004;262:63-68.

Late, L_Part_II et al., Selective combustion of hydrogen in the presence of hydrocarbons 1. Pt-based catalysts. Appl Catal A 2004;262:53-56.

Kaneko S, et al., "Dehydrogenation of propane combined with selective hydrogen combustion over Pt—Sn bimetallic catalysts", Appl Catal A 2009;356:80-7.

Grasselli_R_K, et al., "Catalytic dehydrogenation (DH) of light paraffins combined with selective hydrogen combustion (SHC) II. DH SHC catalysts physically mixed (redox process mode)", Appl Catal A 1999;189:9-14.

Blank JH, et al., "Redox kinetics of ceria-based mixed oxides in selective hydrogen combustion", ChemPhysChem 2007;8:2490-7.

Beckers J, et al., "Bismuth-doped ceria, Ce0.90Bi0.10O2: a selective and stable catalyst for clean hydrogen combustion", Adv Synth Catal 2009;351:1557-66.

Gómez-Quero, Santiago et al., "Understanding the redox behaviour of PbCrO4 and its application in selective hydrogen combustion", Dalton Trans 2012;41:12289-95.

Dudek R.B, et al., "Manganese-containing redox catalysts for selective hydrogen combustion under a cyclic redox scheme", AlChE J 2018;64:3141-50.

Dudek R.B, Tian Y, Jin G, Blivin M, Li F. "Reduction kinetics of perovskite oxides for selective hydrogen combustion in the context of olefin production", Energy Technol 2019;1900738:1-12.

Van Der Zande, L.M.et al. "Design and Parallel Synthesis of Novel Selective Hydrogen Oxidation Catalysts and their Application in Alkane Dehydrogenation", Adv. Synth. Catal., 2002, vol. 344(8) pp. 884-889.

Rothenberg, G., "Solvent-Free Synthesis of Rechargeable Solid Oxygen Reservoirs for Clean Hydrogen Oxidation.", Angew. Chem. Int. Ed, 2003, vol. 42, pp. 3366-3368.

De Graaf, E.A. et al., "Selective hydrogen oxidation in a mixture with ethane/ethene using cerium zirconium oxide", Appl. Catal. A, 2004, vol. 262, pp. 201-206.

De Graaf, E.A. et al., "Two-Step Catalytic Oxidative Dehydrogenation of Propane: An Alternative Route to Propene", Org. Process. Res. Dev., 2005, vol. 9, pp. 397-403.

Blank_J_H et al., "A "Green Route" to Propene through Selective Hydrogen Oxidation.", Chem.—A Eur. J., 2007, vol. 13, pp. 5121-5128.

Beckers, J. et al., Selective Hydrogen Oxidation Catalysts via Genetic Algorithms, Adv. Synth. Catal., 2008, vol. 350, pp. 2237-2249.

Beckers_Rothenberg et al. "Lead-containing solid "oxygen reservoirs" for selective hydrogen combustion", Green Chem., 2009, vol. 11, pp. 1550-1554.

Beckers_Drost et al., "Selective Hydrogen Oxidation in the Presence of C3 Hydrocarbons Using Perovskite Oxygen Reservoirs", ChemPhysChem., 2008, vol. 9, pp. 1062-1068.

Grasselli_Stern et al., "Catalytic dehydrogenation (DH) of light paraffins combined with selective hydrogen combustion (SHC)", Applied Catalysis A:General, 1999, vol. 189, pp. 1-8.

Zhu, X. et al., "Chemical Looping Beyond Combustion—A Perspective", Energy Environ. Sci., 2020, vol. 13, pp. 772-804.

Grasselli, R. K. "Site isolation and phase cooperation: Two important concepts in selective oxidation catalysis: A retrospective.", Catal. Today, 2014, vol. 238, pp. 10-27.

International Preliminary Examination Report on Patentability from International Application No. PCT/US2023/085560 issued Jun. 24, 2025.

Written Opinion of the International Search Authority from International Application No. PCT/US2023/085560 mailed Apr. 4, 2024.

International Search Report from International Application No. PCT/US2023/085560 mailed Apr. 4, 2024.

* cited by examiner

DECARBONIZED OLEFINS PRODUCTION USING PROCESS INTENSIFICATION

RELATED APPLICATIONS

This application claims the priority benefit of U.S. Provisional Patent Application Ser. No. 63/434,463 filed 21 Dec. 2022.

INTRODUCTION

Process intensification (PI), a technique aimed at modifying conventional chemical processes into more cost-effective, productive, greener and safer processes, offers the opportunity to address some of the challenges encountered in mitigating effects of greenhouse gas (GHG) emissions. PI technologies are characterized by equipment size reduction through enhanced and targeted mixing, and mass/heat transfer, leading to improved selectivity, high energy efficiency, reduced capital cost and waste reduction. The smaller processing volumes handled in intensified systems offer the potential to reduce material costs and improve safety.

The production of light olefins (ethylene and propylene) is a particularly compelling target for process intensification, with a combined production of over 200 million tons and 220 Mt. $CO_2$ eq emissions in 2010 from these two chemicals alone (18% of the sector total)1. Recent reports indicate substantial growth in both markets (global production of at least 165 million tons ethylene and 110 million tons propylene in 2017, or greater than 4% annual demand growth for each), and industrial sources indicate that process emissions have scaled at a commensurate rate2. Often described as the building blocks of the chemicals industry, ethylene ($C_2H_4$) and propylene ($C_3H_6$) are direct precursors for polyethylene and polypropylene (each representing approximately two-thirds of the demand for the respective monomer), and demand for these materials is projected to increase nearly 70% by 2050[4. Highly endothermic cracking reactions, high operating temperatures (600-900° C.), feed heating requirements, and complex downstream separations result in high energy as well as $CO_2$ emissions intensity of production of these chemicals6.

In order to overcome the restriction of thermodynamic equilibrium, oxy-dehydrogenation (ODH) of propane has been studied by many research groups. However, there has been no breakthrough in the search for catalysts that provide the necessary yield of propylene for commercial application. As an alternative to ODH, a different method based on a combination of dehydrogenation (DH) with selective hydrogen combustion (SHC) has been proposed. Selective hydrogen combustion (SHC) can be considered as an extending technique of catalytic hydrogen combustion, by which hydrogen can be selectively burned off in a group of combustible components. The concept of SHC was put forward as early as 1980s for the improvement of DH.

The selective removal of hydrogen during dehydrogenation—and other endothermic, equilibrium-limited, $H_2$-producing processes—allows for enhanced yields of these olefins. The major impact of this new technology is its significant GHG and energy reduction potential. Current PDH processes generate over 1.5 tons of $CO_2$ per ton of propylene7. The main source of GHG emission for a PDH plant is the fuel burnt to supply the endothermic heat of reaction, which is ~3000 MJ/ton of propylene. Oxidation of hydrogen produced during reaction can supply most of this endothermic heat. Since the PDH reaction is equilibrium limited, removing hydrogen allows higher conversions at lower temperatures. Additionally, when compared to oxidative dehydrogenation (ODH), CL-ODH achieves $H_2$ removal by utilizing the active lattice oxygen, which (i) minimizes the risk of product over-oxidation to $CO_x$, (ii) carries out reactive separation of $O_2$ from $N_2$.

The SHC technique has been successfully coupled with the DH process of ethylbenzene to produce styrene by using modified Pt, Pd, or Rh catalysts for SHC and Fe catalysts for DH [8,9] (Lummus/UOP SMART SM process). However, this combination of SHC coupled with DH process for light olefins production from alkanes such as ethane, propane and butane has not been commercialized so far. Several challenges hinder these processes such as combustion of hydrocarbon molecules leading to low selectivity to hydrogen combustion and poor stability of the SHC catalysts.

Due to increased commercial demand for light olefins especially propylene in recent years, many efforts have been made to enhance the selectivity of hydrogen combustion and apply this technique to improve the production efficiency of dehydrogenation of light alkanes. For example, Lin et al. developed a novel catalyst, SiCuHZSM-5, and applied it for the selective combustion of hydrogen during isobutane dehydrogenation [10]. They reported a high selectivity towards hydrogen combustion at 550° C. and 1 atm for the mixture of hydrogen, isobutane and air with a volume ratio of 2/2/96. Grasselli's group tested many metal oxides as SHC catalysts for propane dehydrogenation using C3H8/C3H6/H2 in the ratio 80/20/20 while co-feeding oxygen at a ratio of 02/H2=10/20 [11]. Their results revealed that In2O3/SiO2 catalyst possessed the best SHC activity and selectivity to hydrogen combustion (99.7%) compared to the others. However, Blekkan et al. observed that the SHC selectivity of In2O3/SiO2 catalyst dropped off when the concentration of either oxygen or propylene was increased [13]. Several other research reports showed that Pt-based catalysts were reported to be effective for both SHC and DH reactions. Blekkan et al. disclosed that below a certain concentration of oxygen, tin doped Pt/SiO2 catalyst could combust hydrogen with about 90% selectivity at 500° C. In contrast, the selectivity of the undoped Pt catalyst was relatively low (around 80%) under the same condition [14]. These results were supported by the work of Kaneko and co-workers who investigated supported PtSn catalysts for propane dehydrogenation combined with SHC reaction at 500° C. [15]. They pointed out PtSn/ZnAIO catalyst could achieve stable propane conversion higher than the equilibrium conversion when the 02/$H_2$ feed ratio was smaller than ½.

Distinct from the co-fed mode used for carrying out SHC reaction where oxygen or air fluid is introduced along with the hydrocarbons, there is another approach, known as redox mode, for selective hydrogen combustion [16]. In this mode, SHC is operated in the absence of gaseous oxygen and a solid oxygen carrier (SOC) is the sole oxidizing agent used to combust hydrogen produced by the dehydrogenation reaction. The SOC thus acts as an oxygen reservoir and hence needs to be recharged with oxygen thus separating the reaction and regeneration cycles similar to chemical looping.

Various oxides were proposed as SOCs used in redox mode such as Bi2O3/SiO2 [16], $Ce_{0.90}Bi_{0.10}O_2$ [18], $PbCrO_4$ [19] and $Na_2WO_4/CaMnO_{3}$ [20], etc. Grasselli et al [16 first explored a redox process mode for the dehydrogenation of propane using a Pt—Sn/HZSM-5 catalyst along with a $Bi_2O_3/SiO_2$ redox catalyst for the selective oxidation of hydrogen. The selectivity of these systems was later corroborated by Late et al[13. Rothenberg's group declared that the bismuth-doped ceria $Ce_{0.90}Bi_{0.10}O_2$ catalyst displayed not only high activity but also high selectivity for the process of oxidative dehydrogenation of propane at temperature of 400° C., since a 90% of the hydrogen feed could be converted at the 98% selectivity [18]. Rothenberg et al. published a comprehensive body of work on the use of doped and promoted $CeO_2$ for selective hydrogen combustion in the context of both ethane and propane dehydrogenation, including a fixed-bed reactor study with a 1D transport modeling component which demonstrated the integrated process scheme that combines dehydrogenation and $H_2$ Oxidation [22-30]. Recent literature reports show some progress on the identification of low-cost and low-toxicity redox catalysts with high selectivity to $H_2$ combustion—for example, doped perovskite oxides $LaFeO_3$ and $LaMnO_3$, prepared from relatively abundant lanthanum oxide and transition metal oxides, were examined by Rothenberg and coworkers and found to have high selectivity to $H_2$ combustion (93%) in the presence of propane and propylene and satisfactory cycle stability [31. Li and his cooperators reported that the $Na_2WO_4/CaMnO_3$ catalyst showed a 89% $H_2$ conversion and 88% selectivity in a mixture of hydrogen and ethane at 850° C., and it also offered a steady SHC performance exceeding 50 redox cycles [20]. Agaskar et al. describe OC-based systems which involve two separately functioning catalysts, one for propane dehydrogenation and one for selective hydrogen combustion32. Agaskar et al [32 also suggest a mixed-metal oxide containing Bi, Sb or Te for the SOC functionality, and report an increase in propylene yield upon the introduction of the SOC catalyst.

US patent U.S. Pat. No. 5,430,209 stated that some metal oxides are easy and faster to be reduced by hydrogen than by hydrocarbons, and hence exhibited superior selective hydrogen combustion (SHC) properties. $Bi_2Mo_3O_{12}$, $In_2Mo_3O_{12}$, $Bi_2O_3$, $Fe_2Mo_3O_{12}$, $Ce_2Mo_3O_{12}$ are some of the examples of metal oxides which were stated to have superior SHC properties. The patent claimed that hydrogen conversion was 85% while propylene conversion was only less than 0.5% when 42% $Bi_2O_3$ on silica come in contact with 1 to 1 mixture of hydrogen and propylene in helium at 550° C. for 140 seconds. The patent also stated that $Bi_2O_3$ is selective for hydrogen combustion in presence of propane and also in the presence of co-fed gaseous oxygen. The propane conversion to CO2 was less than 2% while the hydrogen conversion exceeded 990% at 500° C. The patent claimed that propane conversion, and propylene yield improved from 24%, and 22% to 47% and 42% when propane reacted over a physically mixed Pt—Sn-ZSM5 and $Bi_2O_3$/Silica at 540° C. compared to Pt—Sn-ZSM5 by itself. However, COx yield also increased from 0.6% to 3%.

Patent US2021/0213424 A1 described the synthesis of redox catalyst for chemical looping oxidative ethane dehydrogenation (CL-ODH). The redox catalysts consist of a core oxygen carrier region having an outer surface, the shell/surface layer including a promoter material. The patent described the methods of using redox catalyst for chemical looping-oxidative cracking (CL-oxy-cracking) and chemical looping-oxidative ethane dehydrogenation (CL-oxy-ODH). The CL-oxy-cracking included using a structured oxygen carrier that combined a low temperature oxygen carrier with a surface modification that suppressed deep oxidation of hydrocarbons, while permitting facile combustion of hydrogen or selective oxidative hydrogenation. In CL-oxy-cracking, alkanes are thermally or catalytically dehydrogenated and the hydrogen produced is selectively combusted by the oxygen carrier. In a separate regeneration step, the reduced oxygen carrier is then regenerated with air, $CO_2$, or steam. Similarly, CL-ODH, ethane is converted to ethylene and hydrogen produced is selectively combusted by a oxygen carrier, followed by regeneration of reduced oxygen carrier by air/$CO_2$ or steam. The patent compared the pure Pr6O11 vs 0.1 wt % $Na_2WO_4$ on Pr6O11 for ethane CL_ODH at 700° C. and claimed that ethane conversion was 20% over 0.1% $Na_2WO_4$ on Pr6O11 compared to pure Pr6O11 catalyst and ethylene yields are 25% and 17% respectively. SHC performance of Mg6MnO8 showed that SHC selectivity was 89% over Mg6MnO8 at 550° C. whereas it was 100% over Mg6MnO8 with 20% $Na_2WO_4$. Similar results claimed for $SrMnO_3$ and $CaMnO_3$ with and without 20% $Na_2WO_4$.

Patent 2004/0167013 A1 disclosed a catalyst system and process for combined cracking and selective hydrogen combustion. Feed stream could comprise hydrocarbonaceous oils having boiling point in the arrange of 221° C. to 566° C., such as stream cracked gas oil, residues, and gas oil, heavy and reduced petroleum crude oil, petroleum atmospheric distillation bottom, heating oil, pitch, asphalt and so forth. The catalyst system comprised of solid acid component, metal-based component comprised of elements from Group 3, and one or more elements from Group 4-15 of the Periodic Table, and at least one of oxygen and sulfur, wherein the elements from Groups 3, Groups 4-15 and oxygen or sulfur are chemically bound to a support. The patent claimed hydrogen yield of 0.23 wt %, and 33 wt % of C1-C4 hydrocarbon, and 39% conversion of light naphtha when used only conventional zeolite catalyst steamed at 700° C. for 2 hr and reaction conducted at 540° C. without the addition of selective hydrogen combustion (SHC) catalyst. However, the patent claimed that with addition of SHC catalyst, the hydrogen yield significantly reduced to 0.021 wt %, and hydrogen conversion calculated to be 53%, COx yield was 0.055 wt %, and $H_2$ selectivity of 81%. The patent reported that better SHC depended upon the preparation and synthesis of SHC catalyst such that it would selectively combust hydrogen in the product, while minimizing non-selective hydrocarbon oxidation. As such $LaMn_{0.4}Ni_{0.4}Al_{0.2}O_3$ catalyst was synthesized as follows: a solution of lanthanum nitrate, manganese chloride, nickel nitrate and aluminum nitrate in DI water was slowly poured into another solution consisting of sodium bicarbonate and tetraethylammonium hydroxide in DI water, resulting in precipitate formation followed by aging the suspension for one hour. The precipitate was recovered by centrifugation and washed with isopropanol to remove water impurity cations and anions. The washing step was repeated to completely remove impurities followed by drying and calcining at 800° C. for 2 hours in air.

Despite these and other efforts, high operation cost for frequent switching due to low oxygen carrying capacity, low selectivity to hydrogen combustion as well as deteriorating stability of SHC catalyst suffering from repeated regeneration are likely the main causes of hindering the commercialization of SHC technique based on redox mode.

SUMMARY OF INVENTION

To be a valid candidate as an $O_2$-carrier for selective hydrogen combustion, the metal oxides should be reducible under dehydrogenation (DH) reaction conditions so as to provide a source of oxygen to combust $H_2$. Additionally, it should provide oxygen in a selective manner, whereby it selectively causes $H_2$ to be converted to $H_2O$ without also oxidizing substantial quantities of the hydrocarbons (in our case, propane and propylene) present in the reactor. In general, a suitable SOC needs to (i) have sufficiently high oxygen carrying capacity, (ii) be highly selective to hydrogen combustion, and (iii) be highly stable with respect to repeated redox cycles.

Oxygen Carrier Selection: The reducible oxides of a narrow selection of metals—Bi, In, Sb, Zn, TI, Pb and Te—are selective for SHC. The current disclosure describes a novel bismuth based solid oxygen carrier which can serve as a catalyst for selective hydrogen combustion when combined with dehydrogenation catalysts.

1. Oxygen carrying capacity: The amount of oxygen that can be donated by a SOC i.e., its oxygen carrying capacity determines how often it should be recharged with oxygen. Hence, it is an important aspect of the SOC. Bismuth oxides have oxygen carrying capacity in the range of about 24 kg oxygen/ton carrier The capacity of the SOC can be improved by judiciously choosing the active oxygen carrying material, its loading level and the support material.

Although the active component of a catalyst is mainly responsible for the catalytic performance, the support and/or modifiers play an important role in the catalyst as well, affecting both the dispersion and the oxygen carrying capacity of the primary SOC. For example, Grasselli et al[18] found that $ZrO_2$ was superior to $SiO_2$, $TiO_2$ and $Al_2O_3$ for supporting In2O3 for the SOC reaction. Similarly, adding Ce, Zr has been shown to increase the oxygen carrying capacity of bismuth oxides.

2. Selectivity: In the context of alkane dehydrogenation (DH) with SOC, selectivity is defined as the distribution of lattice oxygen between hydrogen combustion and hydrocarbon combustion. Coupling oxidative dehydrogenation (ODH) with SOC is challenging for alkanes, since selective $H_2$ combustion is more difficult at higher temperatures due to the higher reactivity of the resulting alkene molecules. Thus, propane ODH reactions are operated at 550° C. or lower. Conversely, ethane ODH has been performed over 600° C. successfully owing to the lower reactivity of ethylene molecule.

However, studies have shown that selectivity of a redox catalyst is time-dependent and depends on the exact extent of oxidation or reduction of SOC at a given time. Many times, the activity and selectivity of redox catalysts are inversely related. A redox catalyst with facile lattice $O^{2-}$ species will favor total rather than partial oxidation[22]. This means that $H_2$ selectivity can change over time on stream. Studies[23-25]have shown that the selectivity, activity and stability can be tuned by doping the oxide lattice with different cations. Promoters and supports can be used to change the activity and/or selectivity of the redox oxides. For instance, Kaneko et al[23] observed that adding Zn to $Al_2O_3$ could enhance the selectivity and stability of $Pt/Al_2O_3$ catalyst at 500° C. for the process of DH combined with SOC.

3. Stability: Catalysts possessing the highest selectivity for $H_2$ combustion in a redox mode typically contain oxides of In, Pb, and Bi, as well as transition metals such as Cr and Cu. The same elements have been doped into cerium oxide across multiple studies[6-14]. However, the stability and performance of these redox catalysts at temperatures above 550° C. (e.g., 650-700° C. for propane ODH or 800-850° C. for ethane ODH) generally decreases over time.

Specifically, bismuth oxide and metallic bismuth have low melting points (817° C. and 272° C., respectively). Hence, the activity of bismuth oxide as a SOC decreases over time. Bismuth can be stabilized by adding an additional component, but this could reduce the available oxygen-carrying capacity if it does not form an active phase. Numerous candidates for adding as dopants or supports to Bi with positive results have been studied such as W, Ce or Zr. Stabilizers for use in the invention are typically rare earth oxides present in an amount of about 10 to about 40 mole percent. Oxides of the entire lanthanide series are believed to work in this invention, although the preferred rare earth oxide is yttria.

We have discovered that the addition of small amounts of zirconia or titania to yttria-doped bismuth oxide greatly enhances the stability of the bismuth oxide. Typical bismuth oxide-yttria compositions are 75% bismuth oxide and 25% yttria. Inclusion of zirconia or titania in amounts up to about 10 wt % enhances the stability of yttria doped bismuth oxide by several orders of magnitude.

In one aspect, the invention provides a mixed metal oxide Selective Oxygen Carrier (SOC) suitable for the selective oxidation of hydrogen at elevated temperatures in the presence of hydrocarbons and steam with a composition of the general formula (AC) (ST) (DP) wherein a) the Active Carrier (AC) represents oxides of Bismuth, b) the active carrier stabilizer (ST) represents oxides of Rare Earth metals selected from the group of cerium (Ce), dysprosium (Dy), erbium (Er), europium (Eu), gadolinium (Gd), lanthanum (La), neodymium (Nd), praseodymium (Pr), samarium (Sm), terbium (Tb), ytterbium (Yb), and yttrium (Y) or mixtures thereof, and c) the Dopant (DP) represents oxides of Group 4 metals Titanium (Ti), Zirconium (Zr), Hafnium (Hf) or mixtures thereof; and characterizable by OC, the oxygen carrying capacity >20 kg $O_2$/ton carrier, Selectivity Parameter ≤0.1 and a stability parameter ≤0.0025 using a test where the SOC is loaded in a fixed-bed reactor such that the 50>dT/dP>10 (diameter of tube to diameter of SOC particles) and 200>L/dP>50 (length of SOC bed to diameter of SOC particles) and 2>dP>0.5 mm exposed to a feed stream of a 1:1 molar mixture of propylene-to-hydrogen at a temperature of 550° C., 0.05 atm pressure and a feed rate of 0.5 $hr^{-1}$ weight hourly space velocity and subjected to 20 cycles, each cycle consisting of reaction for 9 minutes followed by 9 minutes of air regeneration with nitrogen purges of 5 minutes between reaction and air regeneration.

Since the SOC cannot be completely distinguished from the prior art based solely on its elemental composition, the measurement described above is needed for a unique characterization of the catalyst. In various embodiments, the SOC may be further characterized by any of the compositions or physical characteristics described herein.

The invention includes a process of dehydrogenating a paraffin, comprising contacting the paraffin with the SOC (as described herein) and a dehydrogenation catalyst in a reaction chamber under conditions sufficient to dehydrogenate the paraffin and resulting in an olefin. The sufficient conditions are conventional conditions for dehydrogenation or identified with no more than routine experimentation.

In another aspect, the invention provides a method of synthesizing the SOC using a sol gel procedure where the organic alkoxide of the support or mixtures are first dissolved in an organic solvent, the solution is hydrolyzed using either a mineral acid or base. Finally, the resultant sol-gel mixture/s is dried and calcined to produce the SOC.

In a further aspect, the invention provides a method of synthesizing the SOC using a co-precipitating procedure where the salts of the SOC or mixtures are first dissolved in water, co-precipitating the salts from the solution using a precipitating agent. Finally, the resultant precipitate is dried and calcined to produce the SOC.

A binder such as alumina, silica or titania may be added to the SOC, then calcined to form the final particle wherein the BET surface area greater than 30 $m^2/g$ and wherein particle size of the mixed-metal oxide SOC is between 30-3000 microns (μm).

In another aspect, the invention provides a method of synthesizing the SOC using the incipient wetness method. A SOC support such as silica, alumina or titania is impregnated with salt solution of a SOC metals, then drying and finally calcining to produce the final form of SOC.

Another aspect of the invention provides a continuous method for dehydrogenating paraffins with a SOC and a suitable dehydrogenating catalyst having 2-8 carbon atoms wherein the process is performed at a reaction temperature of 500-800° C., a space velocity of 0.1-1 $hr^{-1}$ a pressure of 0.01-0.2 MPa and a SOC to Dehydrogenating catalyst ratio of 0.1 to 10 wt/wt f (mass SOC/mass dehydrog. catalyst). The paraffin feedstock is contacted with the catalyst under dehydrogenation conditions for a reaction period in the range of about 0.05 second to 10 minutes. Following the reaction period, the catalyst is thereafter regenerated by contacting said catalyst with air. The catalyst regeneration is performed at a reaction temperature of 500-800° C., a pressure of 0.01-0.2 MPa and a regeneration period ranging from about 1 to 10 minutes. The process can be carried out in a fluidized bed reactor or a fixed-bed swing reactor. Preferably, the method comprises 2-10,000 cycles or 2-1000 or 2-100 cycles wherein preferably no more than 5% or 2% or no more than 1 mass % fresh catalyst added in each cycle (on average).

Another aspect of the invention provides a continuous method of catalytic cracking of hydrocarbons by contacting the hydrocarbon having 4-40 carbon atoms with the SOC and a suitable cracking catalyst in a reaction chamber under conditions sufficient to crack the hydrocarbon into smaller molecules contacting hydrocarbons with the SOC and a suitable cracking catalyst at a reaction temperature of 500-800° C., a space velocity of 0.1-60 $hr^{-1}$ and a pressure of 0.01-0.2 MPa, a steam concentration of 0-30 wt %, and a SOC to cracking catalyst ratio of 0.1 to 10 wt/wt for a reaction period in the range of 0.05 second to 10 minutes; regenerating the SOC and the cracking catalyst with an oxygen-containing gas wherein said regeneration is performed at a reaction temperature of 500-800° C., a pressure of 0.01-0.2 MPa and a regeneration period ranging from 0.05 second to 10 minutes.

In any of its aspects, the invention can be further characterized by one or any combination of the following: wherein the AC (active carrier) species makes up 1 to 75 wt % of the total weight of the SOC, where weight includes the transition metals and associated oxygen needed to balance the oxidation state of the transition metals; wherein the active carrier (AC) species makes up 1 to 50 wt % of the total weight of the SOC; wherein the active carrier (AC) species makes up 1 to 40 wt % of the total weight of the SOC; wherein the DP (dopant) makes up 1 to 15 wt % of the total weight of the SOC; wherein the DP (dopant) makes up 1 to 10 wt % of the total weight of the SOC; wherein the DP (dopant) makes up 1 to 5 wt % of the total weight of the SOC; wherein ST (the SOC stabilizer) makes up 1 to 50 wt % of the total weight of the SOC; wherein ST (the SOC stabilizer) makes up 1 to 35 wt % of the total weight of the SOC; wherein ST (the SOC stabilizer) makes up 1 to 15 wt % of the total weight of the SOC; wherein said SOC composition has less than 2% by weight of either Copper (Cu) or Manganese (Mn) or Magnesium (Mg); wherein the BET surface area >30 $m^2/g$; wherein the SOC is synthesized using inorganic salts comprising the steps of a) dissolving appropriate salts of the AC, ST and DP or mixtures thereof in water, b) coprecipitating the salts using a precipitating agent such as Ammonium Hydroxide, c) drying and calcining the resultant precipitate to produce the SOC, and d) adding a carrier support CS to the SOC to form the particle; wherein the SOC is synthesized using a sol gel procedure comprising the steps of a) dissolving an organic alkoxide, acetate of AC, ST and DP or mixtures thereof in an organic solvent, b) hydrolyzing the organic alkoxide, acetate solution, preferably in the presence of an acid or base catalyst, to produce a gel, c) drying and calcining the resultant gel to produce the SOC, and d) adding a carrier support CS to the SOC to form the particle; wherein the SOC and support is calcined at 500-1,100° C., preferably at 550-800° C. and most preferably at 550-650° C. for 2-6 hrs in an oxygen containing atmosphere, preferably air; wherein the SOC is synthesized using inorganic salts comprising the steps of a) dissolving appropriate salts of the AC, ST and DP or mixtures thereof in water, b) impregnating the carrier support CS with the salt solution, c) drying and calcining the resultant precipitate preferably at 550-800° C. and most preferably at 550-650° C. for 2-6 hrs in an oxygen containing atmosphere, preferably air to produce the SOC particle; wherein the volume average particle size of the mixed-metal oxide SOC is 30-3000 microns (μm); wherein paraffins are carried out in a fluidized bed reactor or a fixed-bed swing reactor; and/or wherein contacting is carried out in a fluidized bed reactor or a fixed-bed swing reactor. Throughout these descriptions, "weight" or "mass" of a metal includes the associated oxygen atoms.

The invention is further elucidated in the examples below. In any of its aspects, the invention may be further characterized by any selected descriptions from the examples, for example, within ±20% (or within ±10%) of any of the values in any of the examples, tables or figures; however, the scope of the present invention, in its broader aspects, is not intended to be limited by these examples.

The invention may provide advantages such as: the product of the catalyst activity and catalyst selectivity exceeding 0.1 ton of product per hour per ton of catalyst; and the overall catalyst consumption does not exceed 1 kg of catalyst per ton of product. None of the prior art meets these three characteristics simultaneously.

Glossary

Oxygen Carrying Capacity—The oxygen carrying capacity (OCC) of the solid oxygen carrier (SOC) is defined as the amount of lattice oxygen available for oxidation. The OCC is usually calculated by assuming that the change in mass of the SOC during reduction is mainly due to the carrier losing lattice oxygen. The OCC is measured in units of kg Oxygen/ton of SOC and an effective SOC will have an OCC >20 kg Oxygen/ton of SOC.

Selectivity Parameter—Since the SOC can combust both hydrogen and the hydrocarbons, a method is required to compare selectivity obtained by different SOCs along with PDH catalysts under various conversions. Selectivity parameter is calculated from the ratio of the rate constant of the hydrocarbon oxidation reaction to the rate constant of the alkane dehydrogenation reaction and remains constant irrespective of the alkane conversion. It can be quantified by the ratio of COx/Olefins (wt/wt) at the reactor exit. A catalyst producing olefins with a high selectivity will have a selectivity parameter <0.1.

Stability Parameter of the SOC—The loss of OCC of the SOC with repeated reaction-regeneration cycles is quantified by the stability parameter which measures the rate of change of SOC capacity with cycle number. The stability parameter is measured as follows: Stability Parameter=[1—$x_{20}/x_1$]/19, where $x_1$ and $x_{20}$ refer to hydrogen conversions of the $1^{st}$ and $20^{th}$ cycle. A SOC with high stability will have a stability parameter value <0.0025. The stability parameter of U.S. Pat. No. 5,430,209 is about 0.006.

Calcination Temperature—The term "calcination temperature" refers to the maximum temperature utilized as an intermediate step in the catalyst synthesis procedure intended to convert the metal salts to their oxide form.

Regeneration Temperature—The catalyst may be regenerated under flowing air gas at elevated temperatures in order to remove heavier hydrocarbons (coke) from the active catalyst structure. The maximum temperature used in this step is referred to as the "regeneration temperature."

Conversion—The term "conversion of a reactant" refers to the reactant mole or mass change between a material flowing into a reactor and a material flowing out of the reactor divided by the moles or mass of reactant in the material flowing into the reactor.

Pore size—Pore size relates to the size of a molecule or atom that can penetrate into the pores of a material. As used herein, the term "pore size" for zeolites and similar catalyst compositions refers to the Norman radii adjusted pore size well known to those skilled in the art. Determination of Norman radii adjusted pore size is described, for example, in Cook, M.; Conner, W. C., "How big are the pores of zeolites?" Proceedings of the International Zeolite Conference, 12th, Baltimore, Jul. 5-10, 1998; (1999), 1, pp 409-414.

"Particle size" is number average particle size, and, for non-spherical particles, is based on the largest dimension.

One of ordinary skill in the art will understand how to determine the pore size (e.g., minimum pore size, average of minimum pore sizes) in a catalyst. For example, x-ray diffraction (XRD) can be used to determine atomic coordinates. XRD techniques for the determination of pore size are described, for example, in Pecharsky, V. K. et at, "Fundamentals of Powder Diffraction and Structural Characterization of Materials," Springer Science+Business Media, Inc., New York, 2005. Other techniques that may be useful in determining pore sizes (e.g., zeolite pore sizes) include, for example, helium pycnometry or low-pressure argon adsorption techniques. These and other techniques are described in Magee, J. S. et at, "Fluid Catalytic Cracking: Science and Technology," Elsevier Publishing Company, Jul. 1, 1993, pp. 185-195. Pore sizes of mesoporous catalysts may be determined using, for example, nitrogen adsorption techniques, as described in Gregg, S. J. at al, "Adsorption, Surface Area and Porosity," 2nd Ed., Academic Press Inc., New York, 1982 and Rouquerol, F. et al, "Adsorption by powders and porous materials. Principles, Methodology and Applications," Academic Press Inc., New York, 1998.

Residence Time—Residence time is the time a substance is in the reaction vessel. It can be defined as the volume of the reactor divided by the flow rate (by volume per second) of gases into the reactor.

Selectivity—The term "selectivity" refers to the amount of production of a particular product (or products) as a percent of all products resulting from a reaction. For example, if 100 grams of products are produced in a reaction and 80 grams of olefins are found in these products, the selectivity to olefins amongst all products is 80/100=80%. Selectivity can be calculated on a mass basis, as in the aforementioned example, or it can be calculated on a molar basis, where the selectivity is calculated by dividing the moles a particular product by the moles of all products. Unless specified otherwise, selectivity is on a mass basis.

Yield—The term "yield" is used herein to refer to the amount of a product flowing out of a reactor divided by the amount of reactant flowing into the reactor, usually expressed as a percentage or fraction. Mass yield is the mass of a particular product divided by the weight of feed used to prepare that product. When unspecified, "%" refers to mass % which is synonymous with weight %. Ideal gas behavior is assumed so that mole % is the same as volume % in the gas phase.

As is standard patent terminology, the term "comprising" means "including" and does not exclude additional components. Any of the inventive aspects described in conjunction with the term "comprising" also include narrower embodiments in which the term "comprising" is replaced by the narrower terms "consisting essentially of" or "consisting of." As used in this specification, the terms "includes" or "including" should not be read as limiting the invention but, rather, listing exemplary components. As is standard terminology, "systems" include to apparatus and materials (such as reactants and products) and conditions within the apparatus.

EXAMPLES

Example 1

Figure 1:
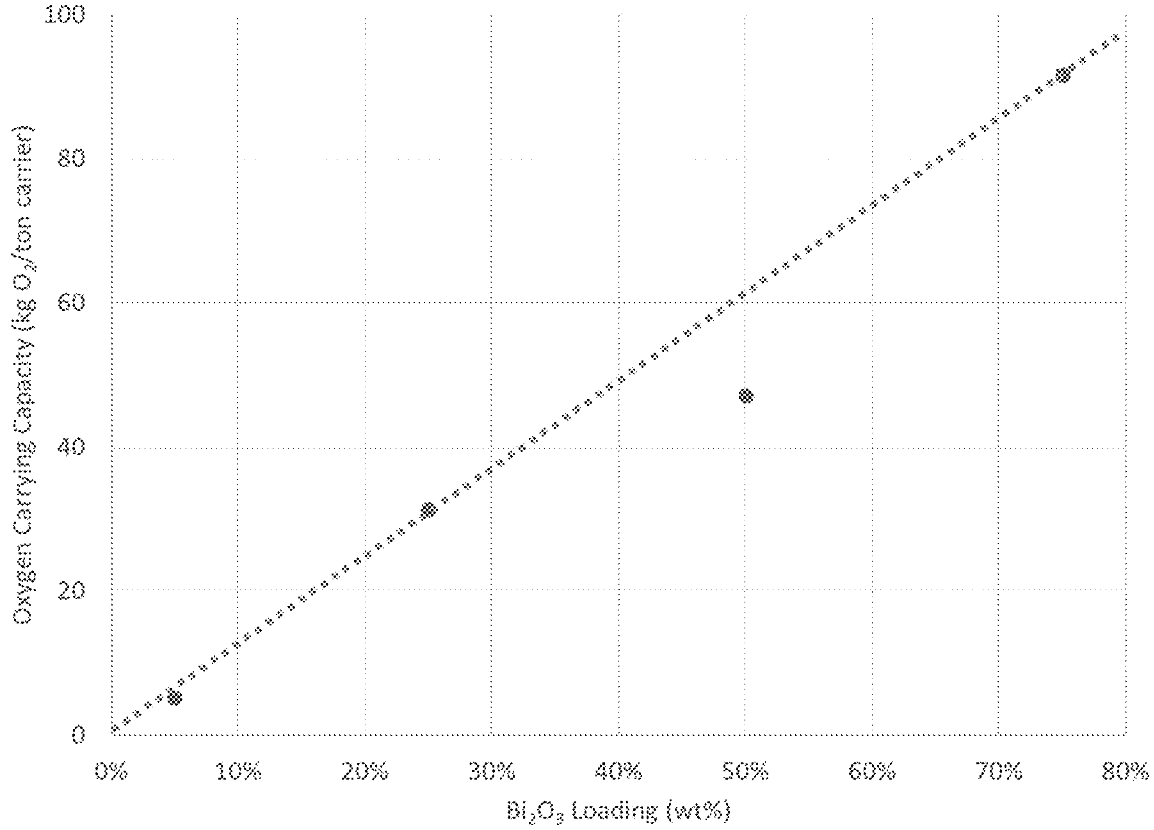
FIG. 1 shows the effect of Bismuth loading on SOC capacity using yttria as the support. Estimates based on gas flow rates show that the $Bi_2O_3$-based SOC has an available oxygen-carrying capacity between 20-90 kg oxygen/ton SOC. Our research indicates that both the support and bismuth loading affect SOC capacity.
Figure 2:
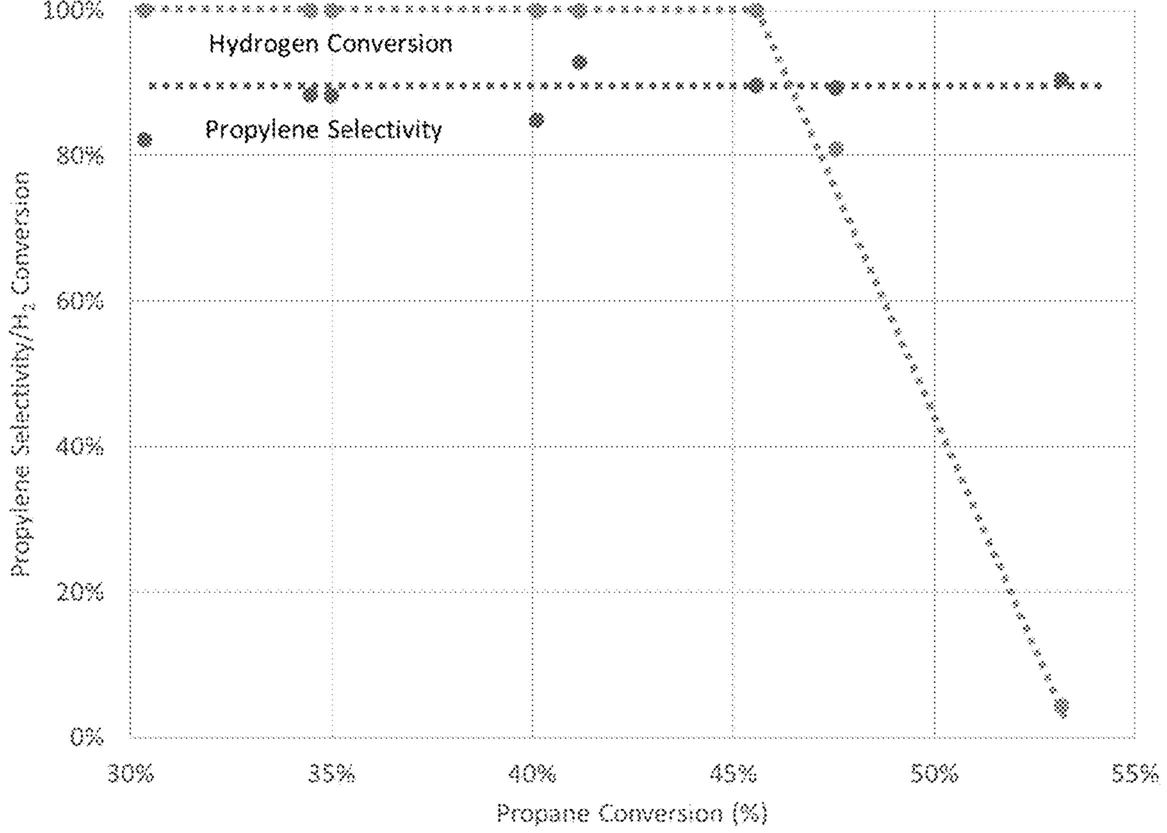
FIG. 2. Combined PDH selective hydrogen combustion using Zr-YDB SOC. Hydrogen conversion and propylene selectivity are shown as a function of propane conversion.

The solid oxygen carrier (SOC) was prepared by dispersing 6 ml of 15% bismuth nitrate solution on 17 gm of zirconia via incipient wetness technique, followed by drying overnight at 120° C. and calcining at 450° C. for 4 hours. This SOC is designated as SOC A.

Example 2

The SOC used was as in Example 1, with the only difference being the support was silica instead of zirconia. This SOC is designated as SOC B.

Example 3

The SOC used was as in Example 1, with the only difference being the support was titania instead of zirconia. This SOC is designated as SOC C.

Example 4

The SOC used was as in Example 1, with the only difference being the support was ceria instead of zirconia. This SOC is designated as SOC D.

Example 5

The SOC was prepared by dispersing alumina binder in the form of acidic Dispal (T25N4-80) from Sasol in 55 ml of DI water for 30 minutes, followed by mixing Bi2O3 powder from Sigma Aldrich to the dispersed Dispal for 30 minutes. The excess water was evaporated by heating to obtain paste form. The paste was dried overnight at 120° C., followed by calcination at 800° C. for 5 hours. The ratio of Bi2O3 to $Al_2O_3$ in the mixture targeted to be 50/50 (wt/wt). This SOC is designated as SOC E.

Example 6

The SOC was prepared as in Example 5 with the only difference being the ratio of Bi2O3 to $Al_2O_3$ in the mixture targeted to be 45/55 (wt/wt). This SOC is designated as SOC F.

Example 7

The SOC was prepared as in Example 5 with the only difference being the ratio of $Bi_2O_3$ to $Al_2O_3$ in the mixture targeted to be 35/65 (wt/wt). This SOC is designated as SOC G.

Example 8

The SOC was prepared by dispersing alumina binder in the form of acidic Dispal (T25N4-80) from Sasol in 55 ml of DI water for 30 minutes, followed by mixing $Bi_2O_3$ powder from Sigma Aldrich to the dispersed Dispal for 30 minutes. The excess water was evaporated by heating to obtain paste form. The paste was dried overnight at 120° C. An aqueous solution consisting of 1 wt % CaO and 1 wt % MgO alkaline earth metal (AEM) oxides in forms of nitrate salts was dispersed on the dried SOC via incipient wetness technique, followed by calcination at 800° C. for 5 hours. The ratio of $Bi_2O_3$ to $Al_2O_3$ in the mixture targeted to be 80/20 (wt/wt). This SOC is designated as SOC H.

Example 9

The SOC was prepared as in Example 8 with the only difference being the ratio of Bi2O3 to $Al_2O_3$ in the mixture targeted to be 70/30 (wt/wt). This SOC is designated as SOC I.

Example 10

The SOC was prepared as in Example 8 with the only difference being the ratio of Bi2O3 to $Al_2O_3$ in the mixture targeted to be 60/40 (wt/wt). This SOC is designated as SOC J.

Example 11

The SOC was prepared as in Example 8 with the only difference being the ratio of $Bi_2O_3$ to $Al_2O_3$ in the mixture targeted to be 50/50 (wt/wt). This SOC is designated as SOC K.

Example 12

The SOC was prepared as in Example 8 with the only difference being the ratio of $Bi_2O_3$ to $Al_2O_3$ in the mixture targeted to be 40/60 (wt/wt). This SOC is designated as SOC L.

Example 13

The SOC was prepared as in Example 8 with the only difference being the ratio of $Bi_2O_3$ to $Al_2O_3$ in the mixture targeted to be 30/70 (wt/wt). This SOC is designated as SOC M.

Example 14

The SOC was prepared as in Example 8 with the only difference being the ratio of $Bi_2O_3$ to $Al_2O_3$ in the mixture targeted to be 20/80 (wt/wt). This SOC is designated as SOC N.

Example 15

The SOC was prepared as in Example 13 with the only difference being the aqueous solution of CaO and MgO alkaline earth metal (AEM) oxides consisting of 2 wt % CaO and 2 wt % MgO. This SOC is designated as SOC 0.

Example 16

The SOC was prepared as in Example 13 with the only difference being the aqueous solution of CaO and MgO alkaline earth metal (AEM) oxides consisting of 3 wt % CaO and 3 wt % MgO. This SOC is designated as SOC P.

Example 17

The SOC was prepared as in Example 13 with the only difference being the aqueous solution of CaO and MgO alkaline earth metal (AEM) oxides consisting of 4 wt % CaO and 4 wt % MgO. This SOC is designated as SOC Q.

Example 18

The SOC was prepared as in Example 13 with the only difference being the aqueous solution of CaO and MgO alkaline earth metal (AEM) oxides consisting of 5 wt % CaO and 5 wt % MgO. This SOC is designated as SOC R.

Example 19

The SOC was prepared as in Example 13 with the only difference being the aqueous solution of CaO and MgO alkaline earth metal (AEM) oxides consisting of 7.5 wt % CaO and 7.5 wt % MgO. This SOC is designated as SOC S.

Example 20

The SOC was prepared as in Example 13 with the only difference being the aqueous solution of CaO and MgO alkaline earth metal (AEM) oxides consisting of 10 wt % CaO and 10 wt % MgO. This SOC is designated as SOC T.

Example 21

The SOC was prepared as in Example 13 with the only difference being the aqueous solution of CaO and MgO alkaline earth metal (AEM) oxides consists of 0 wt % CaO and 4 wt % MgO. This SOC is designated as SOC U.

Example 22

The SOC was prepared by adding AEM to the commercial bismuth aluminate hydrate from Sigma Aldrich. An aqueous solution consisting of 3 wt % CaO and 3 wt % MgO alkaline earth metal (AEM) oxides in forms of nitrate salts was dispersed on commercial bismuth aluminate via incipient wetness technique, followed by drying overnight at 120° C., and calcining at 550° C. for 4 hours. This SOC is designated as SOC V.

Example 23

The SOC was prepared as in Example 22 with the only difference being the aqueous solution of CaO and MgO alkaline earth metal (AEM) oxides consisting of 7.5 wt % CaO and 7.5 wt % MgO. This SOC is designated as SOC W.

Example 24

The SOC was prepared as in Example 22 with the only difference being the aqueous solution of CaO and MgO alkaline earth metal (AEM) oxides consisting of 10 wt % CaO and 10 wt % MgO. This SOC is designated as SOC X.

Example 25

The SOC was prepared as in Example 22 with the only difference being the aqueous solution of CaO and MgO alkaline earth metal (AEM) oxides consisting of 15 wt % CaO and 15 wt % MgO. This SOC is designated as SOC Y Example 26

The SOC was prepared by dispersing alumina binder in the form of acidic Dispal (T25N4-80) from Sasol in 25 ml of DI water for 30 minutes, followed by mixing 50 wt % $Bi_2O_3$ and 50 wt % $Y_2O_3$ powders from Sigma Aldrich, and Alfa Aesar to the dispersed Dispal for 30 minutes. The excess water was evaporated by heating to obtain paste form. The paste was dried overnight at 120° C. and calcined at 800° C. for 5 hours. The ratio of $Bi_2O_3$ and $Y_2O_3$ combined to $Al_2O_3$ in the mixture targeted to be 80/20 (wt/wt). This SOC is designated as SOC Z.

Example 27

The SOC was prepared as in Example 26 with the only difference being the ratio of $Bi_203$ and $Y_2O_3$ combined to $Al_2O_3$ in the mixture targeted to be 70/30 (wt/wt). This SOC is designated as SOC AA.

Example 28

The SOC was prepared via precipitation method. An aqueous solution of 3M nitric acid was prepared by mixing 54 ml of 70% nitric acid in 146 ml of DI water, followed by dissolving yttrium nitrate, zirconium oxy nitrate and bismuth nitrate salts at room temperature. Water insoluble precipitates of bismuth, zirconia and yttrium hydroxides were obtained by adding 2M $NH_4OH$ dropwise until the pH of solution became to 8 and filtration. The precipitate was dried overnight at 120° C. and calcined at 800° C. for 5 hours. The ratio of $Bi_2O_3$ and $Y_2O_3$ in the mixture targeted to be 25/75 (wt/wt). This SOC is designated as SOC AB.

Example 29

The SOC was prepared as in Example 28 with the only difference being the ratio of $Bi_203$ and $Y_2O_3$ in the mixture targeted to be 50/50 (wt/wt). This SOC is designated as SOC AC.

Example 30

The SOC was prepared as in Example 28 with the only difference being the ratio of $Bi_203$ and $Y_2O_3$ in the mixture targeted to be 75/25 (wt/wt). This SOC is designated as SOC AD.

SOC Tests

The SOCs from examples 28-30 were tested as follows: SOC was loaded in a packed bed reactor with reactor to such that $d_T/d_p>10$ and $L/d_p>50$. The SOC was activated by flowing air at 550° C. for 4 hours. Experiments were carried out in a fixed-bed reactor at temperatures of 550° C. and a GHSV of 5000/hr, which are typical conditions for dehydrogenation processes.

Combined PDH+SOC Test

The SOC from Example 29 was combined with the ExOlt dehydrogenation catalyst (4:1 wt/wt ratio) to run the reaction coupled with selective hydrogen oxidation under commercial reactor conditions, Exelus used its patented ExOlt dehydrogenation catalyst (U.S. patent Ser. No. 11/478,778). Results are shown in FIG. 5. The tests show high conversion of propane (>45%) with a high propylene selectivity (>85%) and low $CO_x$ formation (SP<0.1). TCD measurements showed that for propane conversion to about 45%, 100% of hydrogen evolved during the dehydrogenation reaction was consumed. This suggests that the SOC was effective under PDH reaction conditions without excessive combustion of hydrocarbons.

While there have been many studies in the literature[(1)] [(2)] to couple selective hydrogen combustion with PDH reaction, none of them have demonstrated the coupled reaction at temperatures greater than 500° C. and/or obtained high propane conversions with high propylene selectivity. Our experiments also show that the SOC is selective to hydrogen combustion not just in the presence of propane but also with large amounts of propylene. To the best of our knowledge, this is the first time a chemical looping-based catalyst system has been successfully applied to obtain high conversions (>45%) at high propylene selectivity (>90 mole %).

REFERENCES

1. Agency, International Energy. *Technology Roadmap: Energy and GHG Reductions in the Chemical Industry via Catalytic Processes.* 2013.
2. Mackenzie, Wood. Ethylene Global Supply Demand Analytics Service. [Online] 2021. https://www.woodmac.com/news/editorial/ethylene-global-supply-demand-analytics-service/.
3. Propylene Global Supply Demand Analytics Service. [Online] 2021. https://www.woodmac.com/ia/news/editorial/proylene-global-supply-demand-dernandanalytics/.
4. IEA. *The Future of Petrochemicals.* 2021.
5. Brazdil, J. F. 289, s.I.: Top. Catal., 2006, Vol. 38.
6. T. Ren, M. Patel, K. Blok. s.I.: Energy, 2006, Vol. 31, pp. 425-451.
7. R. B. Dudek, F. Li: Fuel Processing Tech, 2021, 218.
8. T. Imai, U.S. Pat. No. 4,435,607 (1984)
9. C. P. Tagmolila, U.S. Pat. No. 5,043,500 (1991)
10. Lin C H, Lee K C, Wan B Z. Development of catalyst system for selective combustion of hydrogen. Appl Catal A 1997; 164:59-67.
11. Grasselli R K, Stern D L, Tsikoyiannis J G. Catalytic dehydrogenation (D H) of light paraffins combined with selective hydrogen combustion (SHC) I. D H/SHC/D H catalysts in series (co-fed process mode). Appl Catal A 1999; 189:1-8.

12. Tsikoyiannis J G, Stern D L, Grasselli R K. Metal oxides as selective hydrogen combustion (SHC) catalysts and their potential in light paraffin dehydrogenation. J Catal 1999; 184:77-86

13. La° te L, Thelina W, Blekkan E A. Selective combustion of hydrogen in the presence of hydrocarbons Part 2. Metal oxide based catalysts. Appl Catal A 2004; 262:63-68.

14. La° te L, Rundereim J I, Blekkan E A. Selective combustion of hydrogen in the presence of hydrocarbons 1. Pt-based catalysts. Appl Catal A 2004; 262:53-56.

15. Kaneko S, Arakawa T, Ohshima M, Kurokawa H, Miura H. Dehydrogenation of propane combined with selective hydrogen combustion over Pt—Sn bimetallic catalysts. Appl Catal A 2009; 356:80-7.

16. Grasselli R K, Stern D L, Tsikoyiannis J G. Catalytic dehydrogenation (D H) of light paraffins combined with selective hydrogen combustion (SHC) I I. D H SHC catalysts physically mixed (redox process mode). Appl Catal A 1999; 189:9-14.

17. Blank J H, Beckers J, Collignon P F, Rothenberg G. Redox kinetics of ceria-based mixed oxides in selective hydrogen combustion. ChemPhysChem 2007; 8:2490-7.

18. Beckers J, Lee A F, Rothenberg G. Bismuth-doped ceria, $Ce_{0.90}$Bi0.1002: a selective and stable catalyst for clean hydrogen combustion. Adv Synth Catal 2009; 351:1557-66.

19. Santiago G Q, Carlos H M, Hendrikx R, Rothenberg G. Understanding the redox behaviour of PbCrO4 and its application in selective hydrogen combustion. Dalton Trans 2012; 41:12289-95.

20. Dudek R B, Gao Y, Zhang J, Li F. Manganese-containing redox catalysts for selective hydrogen combustion under a cyclic redox scheme. AIChE J 2018; 64:3141-50.

21. Dudek R B, Tian Y, Jin G, Blivin M, Li F. Reduction kinetics of perovskite oxides for selective hydrogen combustion in the context of olefin production. Energy Technol 2019; 1900738:1-12.

22. L. M. van der Zande, E. A. de Graaf, G. Rothenberg. s.I.: Adv. Synth. Catal., 2002, Vol. 344, pp. 884-889.

23. G. Rothenberg, E. A. De Graaf, A. Bliek. s.I.: Angew. Chem. Int. Ed, 2003, Vol. 42, pp. 3366-3368.

24. E. A. De Graaf, A. Andreini, E. J. M. Hensen, A. Bliek. s.I.: Appl. Catal. A, 2004, Vol. 262, pp. 201-206.

25. E. A. De Graaf, G. Zwanenburg, G. Rothenberg, A. Bliek. s.I.: Org. Process. Res. Dev., 2005, Vol. 9, pp. 397-403.

26. J. H. Blank, J. Beckers, P. F. Collignon, F. Clerc, G. Rothenberg. s.I.: Chem. —A Eur. J., 2007, Vol. 13, pp. 5121-5128.

27. J. H. Blank, J. Beckers, P. F. Collignon, G. Rothenberg. s.I.: ChemPhysChem., 2007, Vol. 8, pp. 2490-2497.

28. J. Beckers, F. Clerc, H. Blank, G. Rothenberg. s.I.: Adv. Synth. Catal., 2008, Vol. 350, pp. 2237-2249.

29. J. Beckers, A. F. Lee, G. Rothenberg. s.I.: Adv. Synth. Catal., 2009, Vol. 351, pp. 1557-1566.

30. J. Beckers, G. Rothenberg. s.I.: Green Chem., 2009, Vol. 11, pp. 1550-1554.

31. J. Beckers, R. Drost, I. Van Zandvoort, Paul F. Collignon, *Gadi* Rothenberg Dr.: ChemPhysChem., 2008, Vol. 9, pp. 1062-1068.

32. Tsikoyiannis, Pradyot A. Agaskar, Robert K. Grasselli, James N. MichaelsP. Thomas Reischman, David L. Stern-John G. 5,430,209 U S, Jul. 4, 1995.

33. R. K. Grasselli, D. L. Stern, J. G. Tsikoyiannis. s.I.: Applied Catalysis A:General, 1999, Vol. 189, pp. 1-8.

34. X. Zhu, Q. Imtiaz, F. Donat. s.I.: Energy Environ. Sci., 2020, Vol. 13, pp. 772-804.

35. S. Kaneko, T. Arakawa, M. Ohshima, H. Kurokawa, H. Miura. s.I.: Applied Catalysis A: General, 2009, Vol. 356, pp. 80-87.

36. E. A. de Graaf, A. Andreini, E. J. M. Hensen and A. Bliek. s.I.: Appl. Catal., A, 2004, Vol. 262, pp. 201-206.

37. Grasselli, R. K. s.I.: Catal. Today, 2014, Vol. 238, pp. 10-27.

What is claimed:

1. A mixed metal oxide Selective Oxygen Carrier (SOC) suitable for selective oxidation of hydrogen at elevated temperatures in the presence of hydrocarbons and steam with a composition of the general formula (AC) (ST) (DP) wherein a) the Active Carrier (AC) represents oxides of bismuth, b) the active carrier stabilizer (ST) represents oxides of Rare Earth metals selected from the group of cerium (Ce), dysprosium (Dy), erbium (Er), europium (Eu), gadolinium (Gd), lanthanum (La), neodymium (Nd), praseodymium (Pr), samarium (Sm), terbium (Tb), ytterbium (Yb), and yttrium (Y) or mixtures thereof, and c) the Dopant (DP) represents oxides of Group 4 metals Titanium (Ti), Zirconium (Zr), Hafnium (Hf) or mixtures thereof; and characterizable by OC, the oxygen carrying capacity >20 kg O2/ton carrier, Selectivity Parameter≤0.1 and a stability parameter ≤0.0025 using a test where the SOC is loaded in a fixed-bed reactor such that the 50>dT/dP>10 (diameter of tube to diameter of SOC particles) and 200>L/dP>50 (length of SOC bed to diameter of SOC particles) and 2>dP>0.5 mm exposed to a feed stream of a 1:1 molar mixture of propylene-to-hydrogen at a temperature of 550° C., 0.05 atm pressure and a feed rate of 0.5 $hr^{-1}$ weight hourly space velocity and subjected to 20 cycles of reaction for 9 minutes followed by 9 minutes of air regeneration with nitrogen purges of 5 minutes between reaction and air regeneration.

2. The SOC composition according to claim 1 wherein the AC (active carrier) species makes up 1 to 75 wt % of the total weight of the SOC, where weight includes the transition metals and associated oxygen needed to balance the oxidation state of the transition metals.

3. The SOC composition according to claim 1 wherein the active carrier (AC) species makes up 1 to 50 wt % of the total weight of the SOC.

4. The SOC composition according to claim 1 wherein the active carrier (AC) species makes up 1 to 40 wt % of the total weight of the SOC.

5. The SOC composition according to claim 1 wherein the DP (dopant) makes up 1 to 15 wt % of the total weight of the SOC.

6. The SOC composition according to claim 1 wherein the DP (dopant) makes up 1 to 10 wt % of the total weight of the SOC.

7. The SOC composition according to claim 1 wherein the DP (dopant) makes up 1 to 5 wt % of the total weight of the SOC.

8. The SOC composition according to claim 1 wherein ST (the active carrier stabilizer) makes up 1 to 50 wt % of the total weight of the SOC.

9. The SOC composition according to claim 1 wherein ST (the active carrier stabilizer) makes up 1 to 35 wt % of the total weight of the SOC.

10. The SOC composition according to claim 1 wherein ST (the active carrier stabilizer) makes up 1 to 15 wt % of the total weight of the SOC.

11. The SOC composition according to claim 1, wherein said SOC composition has less than 2% by weight of either Copper (Cu) or Manganese (Mn) or Magnesium (Mg).

12. A method making the SOC of claim 1, wherein the SOC is synthesized using inorganic salts comprising the steps of:

a) dissolving appropriate salts of the AC, ST and DP or mixtures thereof in water;

b) coprecipitating the salts using a precipitating agent;

c) drying and calcining the resultant precipitate to produce the SOC;

d) adding a carrier support CS to the SOC to form a SOC particle.

13. A method making the SOC of claim 1, wherein the SOC is synthesized using a sol gel procedure comprising the steps of a) dissolving an organic alkoxide, acetate of AC, ST and DP or mixtures thereof in an organic solvent;

b) hydrolyzing the organic alkoxide, acetate solution, to produce a gel;

c) drying and calcining the resultant gel to produce the SOC;

d) adding a carrier support CS to the SOC to form a SOC particle.

14. A method making the SOC of claim 1, wherein the SOC is synthesized using inorganic salts comprising the steps of a) dissolving appropriate salts of the AC, ST and DP or mixtures thereof in water;

b) impregnating the carrier support CS with the salt solution;

c) drying and calcining the resultant precipitate in an oxygen containing atmosphere to produce a SOC particle.

15. The SOC composition according to claim 1 wherein particle size of the mixed-metal oxide SOC is 30-3000 microns (μm).

16. A process of dehydrogenating a paraffin, comprising contacting the paraffin with the SOC of claim 1 and a suitable Dehydrogenating catalyst in a reaction chamber under conditions sufficient to dehydrogenate the paraffin and resulting in an olefin.

17. A process for continuous dehydrogenating of paraffins having 2-8 carbon atoms, comprising:

contacting said paraffins with the SOC composition according to claim 1 and a suitable Dehydrogenating catalyst at a reaction temperature of 500-800° C., a space velocity of 0.1-60 $hr^{-1}$ and a pressure of 0.01-0.2 MPa and a SOC to Dehydrogenating catalyst ratio of 0.1 to 10 wt/wt for a reaction period in the range of 0.05 second to 10 minutes;

regenerating the SOC and the Dehydrogenating catalyst with an oxygen-containing gas wherein said regeneration is performed at a reaction temperature of 500-800° C., a pressure of 0.01-0.2 MPa and a regeneration period ranging from 0.05 second to 10 minutes.

18. The process of claim 17 wherein said contacting is carried out in a fluidized bed reactor or a fixed-bed swing reactor.

19. A process for cracking hydrocarbons, comprising: contacting a hydrocarbon having 4-40 carbon atoms with the SOC of claim 1 and a suitable cracking catalyst in a reaction chamber under conditions sufficient to crack the hydrocarbon into smaller molecules.

20. A process for cracking hydrocarbons, comprising:

contacting said hydrocarbons with the SOC composition according to claim 1 and a suitable cracking catalyst at a reaction temperature of 500-800° C., a space velocity of 0.1-60 $hr^{-1}$ and a pressure of 0.01-0.2 MPa, a steam concentration of 0-30 wt %, and a SOC to cracking catalyst ratio of 0.1 to 10 wt/wt for a reaction period in the range of 0.05 second to 10 minutes;

regenerating the SOC and the cracking catalyst with an oxygen-containing gas wherein said regeneration is performed at a reaction temperature of 500-800° C., a pressure of 0.01-0.2 MPa and a regeneration period ranging from 0.05 second to 10 minutes.

* * * * *